Patented Aug. 4, 1931

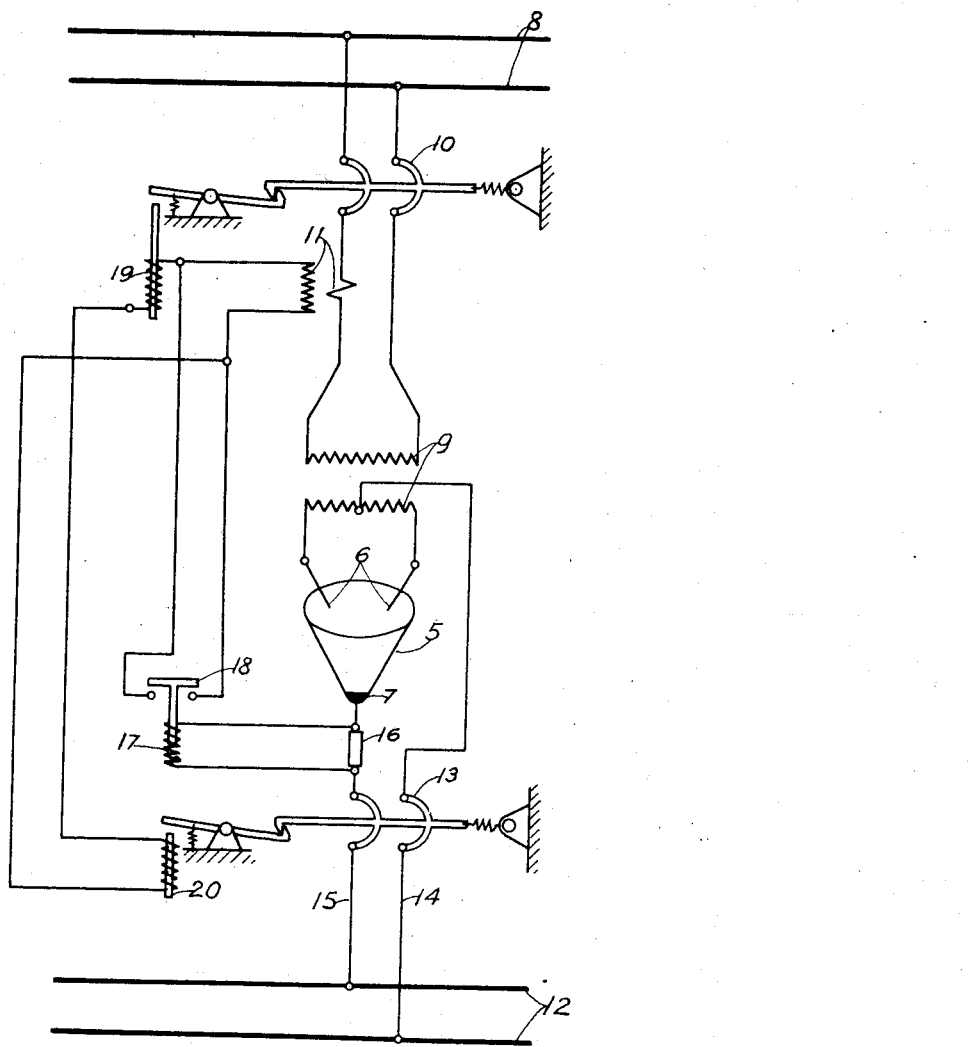

1,817,084

UNITED STATES PATENT OFFICE

ROBERT KELLER, OF ENNETBADEN, SWITZERLAND, ASSIGNOR TO AKTIENGESELL-SCHAFT BROWN BOVERI & CIE., OF BADEN, SWITZERLAND, A JOINT-STOCK COMPANY OF SWITZERLAND

CIRCUIT FOR PROTECTING ELECTRIC RECTIFIERS FROM REVERSE CURRENTS

Application filed September 11, 1928, Serial No. 305,197, and in Germany September 12, 1927.

This invention relates to electric current rectifier systems, and, more particularly, to means for switching a mercury arc rectifier out of a rectifier installation when the rectifier is affected by reverse current or backfiring.

In installations including a plurality of rectifiers, it is especially necessary to switch out any one of the rectifiers when the same is subject to back-firing, to prevent disturbance and damage to the remainder of the installation. The particular rectifier affected by the reverse current should be put out of operation as soon as possible, to prevent damage thereto. Such action is ordinarily dependent upon manual operation of various switches by an attendant after an inspection of indicating devices shows that backfiring is taking place in the rectifier. Manual control of such nature is always slow and uncertain, and, in many instances, is available only at great expense.

It is, therefore, among the objects of the invention to provide automatic means for switching a backfiring rectifier out of an electric current rectifier installation.

Another object of the invention is to provide for selectively switching out a rectifier, affected by reverse current, from a rectifier installation.

A further object of the invention is to provide relay means for protecting a rectifier from reverse current.

Another object of the invention is to provide reverse current or reverse direction relay means in the DC side of a rectifier for protecting the same from reverse currents or backfiring by simultaneously opening switches in the A. C. and D. C. current sides.

Other objects and advantages will hereinafter appear in the description and the drawings in which, for the purpose of illustration only, an embodiment of the invention is shown and wherein Fig. 1 is a diagrammatic showing of the invention, adapted, for purposes of simplicity in illustration and description, to a single-phase installation.

Referring more particularly to the drawing by characters of reference, 5 indicates a mercury arc rectifier of a well known construction having anodes 6 and a cathode 7. The rectifier 5 is supplied with current, in the usual manner, from an A. C. source 8 by means of a rectifier supplying transformer 9. The connecting lines between the source of A. C. current and the primary winding of the rectifier supplying transformer 9 are provided with an oil switch 10. One of the connecting lines has inserted therein the primary winding of a transformer 11 for a control circuit to be hereinafter more specifically described. Lines 14 and 15 connecting the secondary winding of the transformer 9 and the cathode 7 with the D. C. lines, in the usual manner, are provided with quick-acting circuit breaker 13.

The leads of a reverse current relay circuit, arranged for protecting the rectifier from reverse currents or backfiring, are connected by means of a shunt 16 into the D. C. line 15. A reverse current relay including a coil 17 and an armature 18 is connected in parallel with the shunt 16. The armature 18 of the reverse current relay is connected across the secondary of the transformer 11 and is arranged to short-circuit the same when the coil 17 is not energized by reverse current flowing through the shunt 16. In normal operation of the rectifier, therefore, armature 18 short-circuits the secondary of transformer 11.

Opening coils 19 and 20, provided with movable cores for armatures which are arranged to open switches 10 and 13 respectively, are connected in series with the secondary winding of the transformer 11. The coils 19 and 20 are supplied by the transformer 11.

In operation, as soon as a reverse current flows through the shunt 16, the coil 17 of the reverse current relay is energized and the armature 18 thereof is raised, thereby opening the short-circuit across the secondary of the transformer 11. Removing the short-circuit from the secondary of the transformer 11 permits current to flow in the coils 19 and 20, connected in series therewith. Current flowing through the coils 19 and 20 causes the cores thereof to rise whereby the switches 10 and 13 are opened and the supply of A. C. current is cut off from the rectifier and the D. C. lines are opened. The rectifier is, therefore, entirely cut off and any reverse currrent or backfiring arc therein is extinguished.

It will be understood that instead of normally short-circuiting the secondary of the control transformer by means of the armature of the reverse current relay, the relay may be connected in series with the secondary winding and the accompanying circuit breaker opening coils.

What I claim is:

1. In a rectifying system for electric current, a rectifier having a plurality of anodes and a cathode, an alternating current line, a transformer connecting said rectifier with said current line, a direct current line connected to and supplied by said rectifier, switches for disconnecting said alternating current and said direct current lines from said rectifier, and a second transformer connected in the alternating side of said system and put into operation responsive to conditions in the direct current side thereof, and means for operating said switches upon operation of said second transformer.

2. In a rectifying system for electric current, a rectifier having a plurality of anodes and a cathode, an alternating current line, a transformer connecting said rectifier with said current line, a direct current line connected to and supplied by said rectifier, switches for disconnecting said alternating current and said direct current lines from said rectifier, and a second transformer connected in the alternating current side of said system, means for operating said second transformer in response to conditions in the direct current side of said system, and means in series with the secondary of said second transformer for simultaneously opening said switches.

3. In a rectifying system for electric current, a rectifier having a plurality of anodes and a cathode, an alternating current line, a transformer connecting said rectifier with said current line, a direct current line connected to and supplied by said rectifier, switches for disconnecting said alternating current and said direct current lines from said rectifier, a shunt connected into said direct current line, a transformer controlled by said shunt, means responsive to conditions in said shunt for causing said transformer to operate, and means in series with said shunt controlled transformer for opening said switches.

4. In a rectifying system for electric current, a rectifier having a plurality of anodes and a cathode, an alternating current line, a transformer connecting said rectifier with said current lines, a direct current line connected to and supplied by said rectifier, switches for disconnecting said alternating current and said direct current lines from said rectifier, a shunt connected into said direct current line, a reverse current relay including a coil and an armature, said coil being connected across said shunt and responsive to conditions therein, a second transformer connected in the alternating current side of said system, said reverse current relay armature being arranged to short-circuit the secondary winding of said second transformer under normal operating conditions of said rectifier, and relays for operating said switches simultaneously upon occurrence of a reverse current in said rectifier.

In testimony whereof I have hereunto subscribed my name this 27th day of August, A. D. 1928.

ROBERT KELLER.